United States Patent
Rasset et al.

(10) Patent No.: US 7,383,914 B2
(45) Date of Patent: Jun. 10, 2008

(54) APPARATUS AND METHOD FOR REDUCING SHEAR LOADING ON ELEMENTS CONNECTING AN AXLE AND A CHASSIS OF A VEHICLE

(75) Inventors: John T. Rasset, Barnesville, MN (US); Bryan J. Garberg, Moorhead, MN (US); Daniel J. Zurn, Horace, ND (US); Thomas G. Lykken, Fargo, ND (US); Robert J. Overmann, Fargo, ND (US); Brian D. Vik, Barnesville, MN (US)

(73) Assignee: CNH America LLC, New Holland, PA (US)

( * ) Notice: Subject to any disclaimer, the term of this patent is extended or adjusted under 35 U.S.C. 154(b) by 301 days.

(21) Appl. No.: 11/021,315

(22) Filed: Dec. 23, 2004

(65) Prior Publication Data

US 2006/0138739 A1   Jun. 29, 2006

(51) Int. Cl.
*B62D 21/09* (2006.01)
*B62D 21/10* (2006.01)
(52) U.S. Cl. ..................... 180/311; 305/138
(58) Field of Classification Search ............... 280/80.1, 280/781, 124.16, 124.116, 124.128; 29/273; 180/9.1, 311; 305/138, 109
See application file for complete search history.

(56) References Cited

U.S. PATENT DOCUMENTS

| | | |
|---|---|---|
| 1,292,771 A | 1/1919 | Reider |
| 2,296,726 A * | 9/1942 | Mohun ........................ 384/158 |
| 3,050,300 A * | 8/1962 | Hickman ..................... 267/294 |
| 3,336,087 A * | 8/1967 | Reinsma ..................... 305/109 |
| 3,695,737 A * | 10/1972 | Alexander et al. .......... 305/138 |
| 3,764,184 A * | 10/1973 | Orr et al. .................... 305/138 |
| 4,016,947 A | 4/1977 | Chamberlain ................. 180/88 |
| 4,540,220 A | 9/1985 | Roeth et al. ................ 301/125 |
| 5,326,128 A | 7/1994 | Cromley, Jr. ............... 280/656 |
| 5,378,006 A * | 1/1995 | Stuart et al. ............. 280/149.2 |

(Continued)

*Primary Examiner*—Ruth Ilan
*Assistant Examiner*—Karen Jane J. Amores
(74) *Attorney, Agent, or Firm*—Patrick M. Sheldrake; John William Stader; Michael G. Harms

(57) ABSTRACT

Referring more particularly to FIG. 4, the present invention red ices such shear loading on the bolts, by utilizing a wedge member or a tapered block 106, inserted and wedged into a space 108 between wedge surfaces 70 and 88, and having oppositely facing outer surfaces 110 and 112 thereby placed into abutment with those surfaces, respectively, so as to exert a fore and aft directed force against those surface, denoted by arrows C, effectively acting to push those surfaces apart and counteracting the shear loads B. Such forces will also act in opposition to and reduce tensile loads acting on bolts 100. Tapered block 106 has at least one passage 114 therethrough (FIG. 3) for the passage of bolts 104 therethrough, to allow insertion of those bolts into threaded holes 98 and tightening those bolts to exert compressive forces against tapered block 106, denoted by arrows D, for holding that block in position. This may also be sufficient to apply a tensile load bolts 100, which are preferably at least generally longitudinally aligned therewith as shown. As a result, a force equilibrium condition can be achieved, which can significantly and predictably reduce and control shear forces acting against the bolts or other connectors for connecting axle housing 74 to the side plates 24 of chassis 22.

14 Claims, 5 Drawing Sheets

U.S. PATENT DOCUMENTS

| | | | |
|---|---|---|---|
| 5,464,243 A | 11/1995 | Maiwald et al. | 280/638 |
| 5,489,114 A | 2/1996 | Ward et al. | 280/638 |
| 5,899,542 A * | 5/1999 | Lykken et al. | 305/131 |
| 5,899,543 A * | 5/1999 | Lykken et al. | 305/131 |
| 6,401,847 B1 * | 6/2002 | Lykken | 180/9.1 |
| 6,550,798 B2 | 4/2003 | MacKarvich | 280/149.2 |
| 6,932,388 B2 * | 8/2005 | Few et al. | 280/787 |
| 6,945,548 B2 * | 9/2005 | Dudding et al. | 280/124.157 |
| 6,951,260 B1 * | 10/2005 | Isley | 180/9.54 |
| 7,066,289 B2 * | 6/2006 | Fujita et al. | 180/9.1 |
| 2001/0020775 A1 * | 9/2001 | Pierce et al. | 280/124.128 |
| 2002/0109327 A1 * | 8/2002 | Timoney et al. | 280/124.135 |
| 2003/0067134 A1 * | 4/2003 | Galazin | 280/124.116 |
| 2004/0188972 A1 * | 9/2004 | Abrat et al. | 280/124.128 |
| 2004/0217572 A1 * | 11/2004 | Hayes et al. | 280/124.116 |
| 2005/0242541 A1 * | 11/2005 | Griffiths | 280/124.11 |

* cited by examiner

APPARATUS AND METHOD FOR REDUCING SHEAR LOADING ON ELEMENTS CONNECTING AN AXLE AND A CHASSIS OF A VEHICLE

TECHNICAL FIELD

This invention relates generally to an apparatus and method for mounting or assembling an axle or axle housing and a chassis of a vehicle, and more particularly, to an apparatus and method which improves fit-up between a chassis and axle and reduces shear loads exerted against connectors such as bolts or the like connecting the axle and chassis.

BACKGROUND ART

Commonly, a heavy-duty vehicle, such as, but not limited to, a work machine such as a tractor, and more particularly, an all-wheel or all-track drive tractor for agriculture, earthmoving and other uses, has a chassis comprised of one or more weldments. Such weldments typically include a plurality of mounting or locating pads and/or plates nominally positioned for surface-to-surface abutting contact with mating mounting pads and/or surfaces on an axle, axle housing, or axle assembly, hereinafter referred to as an "axle". The axle may be of wrought metal, cast, and/or welded construction. Typically, the known mounting pads and/or plates are oriented horizontally and are connected together by connectors-such as bolts and nuts or other fasteners.

One problem that has been found to arise with the known chassis and axle arrangements is that the connectors are often subjected to substantial shear loads in addition to longitudinal loads, when the chassis and axle are aligned and "fit-up" or brought together for assembly, and subsequently during operation of the vehicle, as a result of tractive effort forces generated at the ground and track or wheel interface. The shear loads applied during fit-up have been found to be the result of several conditions which in particular can include normal manufacturing tolerance stack-ups, as well as deformation, warpage and/or distortion of the chassis weldment as a result of the heat generated by welding. Such conditions can result in the mounting pads and/or plates being mis-positioned and/or mis-aligned or skewed, relative to their nominal positions and orientations. Subsequently, during fit-up, substantial forces must be applied to bring the mating pads and/or plates together. If the pads and/or plates cannot be satisfactorily brought together, shims or spacers can be used therebetween. However, the amount and direction or manner of warpage or deformation may not be uniform between weldments or vehicles, such that the location, number of shims, and the fit-up will typically vary between vehicles, which can add complexity and increase assembly time. Additionally, while use of shims and spacers can reduce axial or longitudinal loading on connectors such as bolts, they will typically not be as effective for reducing shear forces acting transversely against the connectors.

Thus, what is sought is an apparatus and method for assembling a chassis weldment of a vehicle or work machine with an axle, which facilitates and improves fit-up, and allows reducing shear loads acting on connectors used for connecting the chassis and axle.

SUMMARY OF THE INVENTION

What is disclosed is an apparatus and method for assembling a chassis and axle of a vehicle or work machine which provides the capabilities, and overcomes one or more of the problems, set forth above.

According to a preferred aspect of the invention, a plurality of locating surfaces or mounting pads are located on the chassis against which the axle can be urged so as to be positioned in a desired assembly or mounting position in relation to the chassis. The chassis and axle are connected and fixed in relation one to the other in the desired position by a plurality of connectors which can be, for instance, common commercially available bolts or other fasteners, extending in a predetermined or first direction. Wedge surfaces are located on the chassis and on the axle, respectively, disposed so as to be in opposing relation at a predetermined angle one relative to the other and define a space therebetween extending in a direction of shear loading or second direction, at least generally transverse to the predetermined or first direction, to be exerted on predetermined ones of the connectors when the axle is in the desired position in relation to the chassis. A tapered block or wedge member having oppositely facing outer surfaces angularly related at about the predetermined acute angle is positionable in the space between the wedge surfaces, so as to face at least substantially in the direction of the shear loading or second direction, and has an extent in that direction between the outer surfaces thereof sufficiently large so as to simultaneously contact the wedge surfaces when the block is positioned in the space. An adjusting member preferably connects the tapered block to at least one of the chassis and the axle, and is adjustable for moving the block to a position for applying forces against the wedge surfaces to urge the wedge surfaces apart. This can also operate to reduce or straighten out some of any warpage, distortion and/or deformation of the adjacent region of the chassis, and reduce at least some of any shear forces acting against the connectors connecting the axle and chassis. Additional connectors extending in the second direction of the shear loading, can then be tightened so as to exert compressive forces against the tapered block, without applying additional shear loads against the original connectors. The additional fasteners will also hold the tapered block in position, and further secure the chassis and axle together.

As discussed above, under the Background Art, it has been observed that locating surfaces and mounting pads located on weldments may be mis-positioned and/or mis-oriented or skewed relative to a nominal or desired position and orientation thereof, as a result of conditions such as warpage resulting from stress changes due to the heat generated by welding, manufacturing tolerances, and the like, such that mating locating surfaces and/or pads which are to be brought into abutment are not perfectly parallel in their free states. As noted, as one alternative, it may be possible that such surfaces and pads could be machined to attain proper position and orientation, and/or shims could be used. However, both of these are time consuming and costly. They also increase variances and non-uniformity between individual ones of mass produced vehicles. By using the apparatus and method of the invention, the axle can be properly fit-up to the vehicle's chassis, preferably by applying torques to the connectors for bringing the opposing locating surfaces or mounting pads together in the desired abutting relation, which, as a consequence, will often cause shear loads or forces to be applied to the connectors. By forceably moving the tapered block or wedge member of the invention in contact with the wedge surfaces, the shear forces can be counteracted and reduced or relieved. Then, the additional connectors extending in the direction of the shear forces can be tightened without applying shear loading to the existing connectors extending in the first direction.

As attendant advantages of the preferred apparatus and method of the invention as just described, fit-up of an axle and chassis of a vehicle is simplified and streamlined, need for machining of locating surfaces and/or mounting pads on the chassis weldment and shimming is eliminated, and shear loads or forces acting on connectors are substantially reduced. Further, with the counteraction or reduction of shear forces, the forces transmitted between the axle and chassis will be more normal to the locating surfaces or mounting pads.

BRIEF DESCRIPTION OF THE DRAWINGS

FIG. 2a is an enlarged fragmentary perspective representation of an axle of the tractor of FIG. 1 showing a representative mounting pad including locating surfaces thereon for use with the invention;

DETAILED DESCRIPTION OF THE INVENTION

Figure 1:
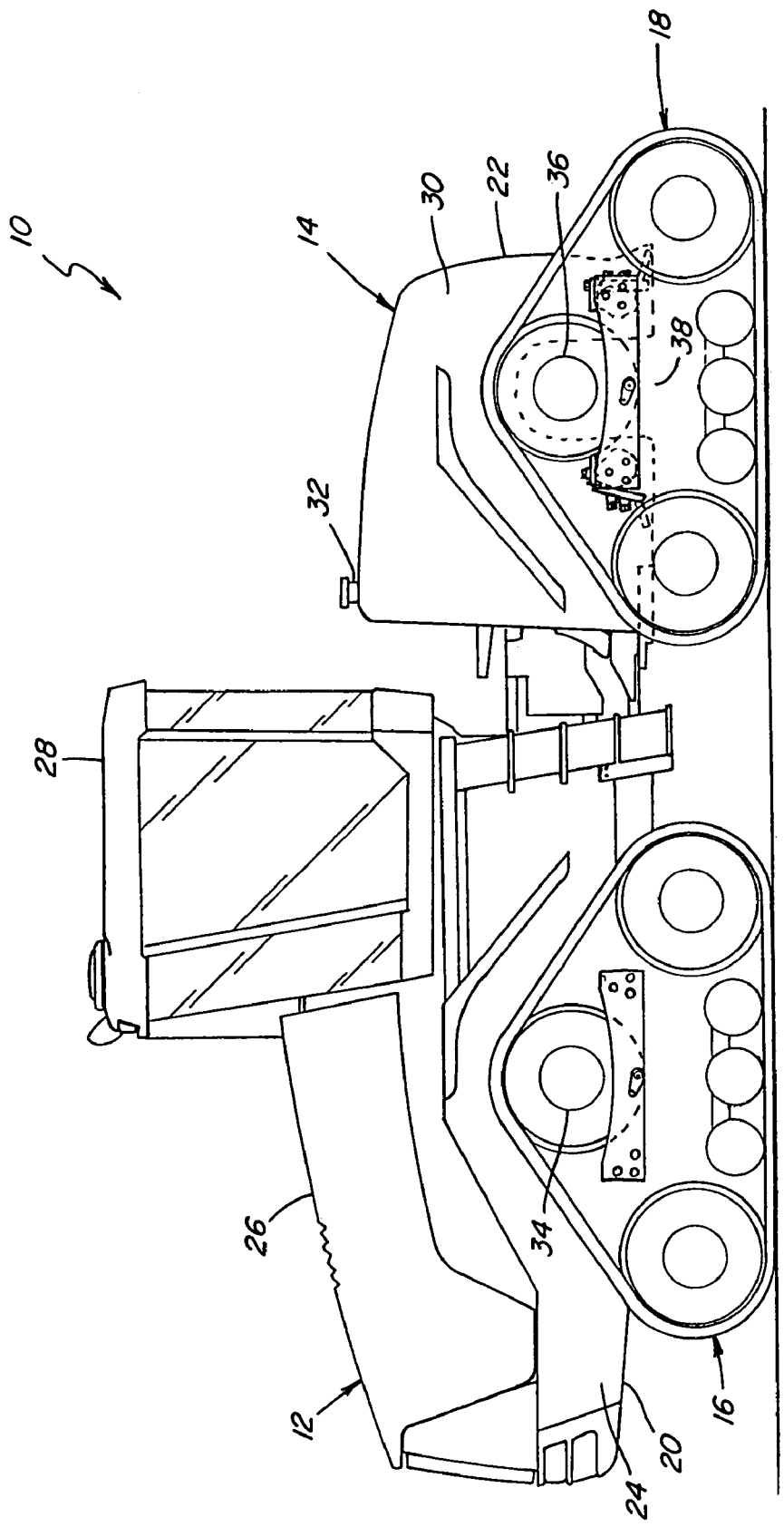
FIG. 1 is a simplified side view of a four-wheel drive tractor including axles assembled to a chassis of the tractor according to the invention.

Referring now to the drawings, in FIG. 1, a vehicle 10, which is a four track drive tractor typically used for such purposes as agriculture, earthmoving, construction, and the like, is shown. Vehicle 10 includes a front segment 12 and a rear segment 14, connected together for pivotal movement one relative to the other, about a central pivotal axis (not shown) therebetween. Front segment 12 is drivingly supported by a pair of front tracks 16 on opposite sides thereof, and rear segment 14 is drivingly supported by a pair of rear tracks 18 on either side thereof. Front segment 12 includes a front chassis 20, and rear segment 14 includes a rear chassis 22. Front chassis 20 includes a pair of spaced apart, fore to aft and upwardly extending side chassis plates, represented by left side chassis plate 24. An engine (not shown) is supported between the chassis side plates under a front hood 26, and an operator cab 28 is supported on the side chassis plates aft of hood 26. Rear chassis 22 includes a pair of spaced apart, fore and aft and upwardly extending side chassis plates, represented by left side chassis plate 30. The chassis plates of rear chassis 22 form the sides of a fuel tank which can be filled through a fill tube 32. Any implement, such as an agricultural, earthmoving, or other implement (not shown), will typically have a tongue which extends beneath rear chassis 22 and connects to a hitch or other connection (also not shown), on front segment 12.

Front tracks 16 are rotatably driven by a front axle 34 which, in turn, is connected in rotatably driven relation to the engine (not shown) by a suitable drive train including a transmission (also not shown). Similarly, rear tracks 18 are drivingly rotated by a rear axle 36 connected to the engine by a drive shaft (not shown). Front axle 34 extends transversely relative to the fore and aft direction through large openings through the side chassis plates, so as to project sidewardly outwardly from each side thereof. Similarly, rear axle 36 extends sidewardly through large openings, represented by opening 38 in left side chassis plate 30. Each axle 34 and 36 is suitably fitted-up and mounted in its respective openings in connection with front chassis 20 and rear chassis 22, respectively, by the apparatus and method of the invention, as will be hereinafter explained.

Figure 2:
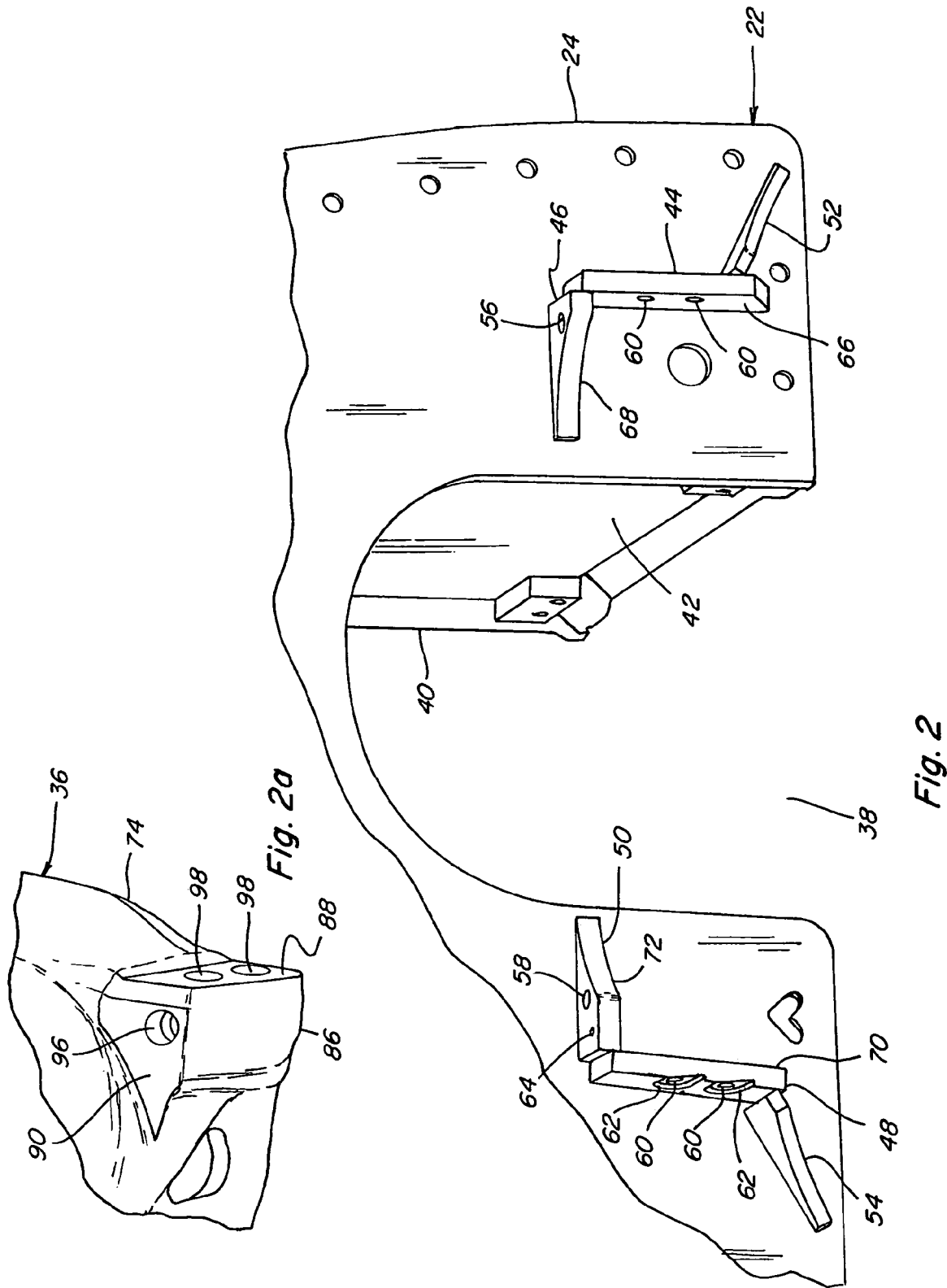
FIG. 2 is an enlarged fragmentary perspective representation of the chassis of the tractor of FIG. 1, showing aspects of the invention thereon.

Referring also to FIG. 2, a portion of rear chassis 22 is shown. More particularly, FIG. 2 shows left side chassis plate 24 of rear chassis 22, illustrating opening 38 extending therethrough. A right side chassis plate 40 is shown in opening 38 behind plate 24. Rear chassis 22 is a weldment, including a plurality of transversely extending plates, represented by plate 42 which extend between and are welded to side chassis plates 24 and 40 to provide strength and rigidity, and also to enclose regions of the chassis for such purposes as forming the fuel tank and the like. Rear chassis 22 includes a plurality of mounting plates for connection of rear axle 36 thereto, including a vertical, sidewardly extending rear mounting plate 44 and a substantially horizontal rear mounting plate 46, both suitably mounted such as by welding to an outer surface of each of left and right side chassis plates 24 and 40, as represented by mounting plates 44 and 46 on plate 24, rearwardly of opening 38. Similarly, a front mounting plate 48 oriented at a small acute angle to vertical so as to extend upwardly and rearwardly, and a horizontal front mounting plate 50, are suitably mounted, such as by welding, to the outer surfaces of side chassis plates 24 and 40, as represented by side chassis plate 24, forwardly of opening 38. An exemplary range of the acute angle of mounting plate 48 to vertical can be from about 1 to about 30 degrees, and is preferably about 5 degrees. Braces 52 and 54 are suitably mounted, such as by welding, to side chassis plates 24 and 40 in connection with front and rear mounting plates 44 and 48, for supporting and strengthening those plates.

Horizontal mounting plates. 46 and 50 include mounting holes 56 and 58 extending in a first predetermined, vertical direction therethrough. Mounting plate 44 includes a pair of mounting holes 60 extending in a second predetermined direction therethrough, transverse to the first predetermined direction, and corresponding to the fore and aft direction. Similarly, mounting plate 48 includes a pair of mounting holes 60 extending therethrough in the second predetermined direction. Additionally, counter bores 62 are located around the forward ends of mounting holes 60. Mounting plate 50 additionally includes a vertically extending adjusting hole 64 therethrough between mounting plate 48 and mounting hole 58. Mounting plate 44 has a forwardly facing locating surface 66, and mounting plate 46 has a downwardly facing locating surface 68, locating surfaces 66 and 68 effectively forming a forwardly and downwardly open inside corner rearwardly of opening 38, used for receiving and locating rear axle 36 in opening 38 in a desired position in relation to chassis 22. Mounting plate 48 includes a rearwardly and slightly downwardly facing wedge surface 70, and mounting plate 50 includes a downwardly facing locating surface 72, which together effectively form a reawardly and downwardly facing corner forwardly of opening 38, used for holding rear axle 36 in the desired position.

Figure 3:
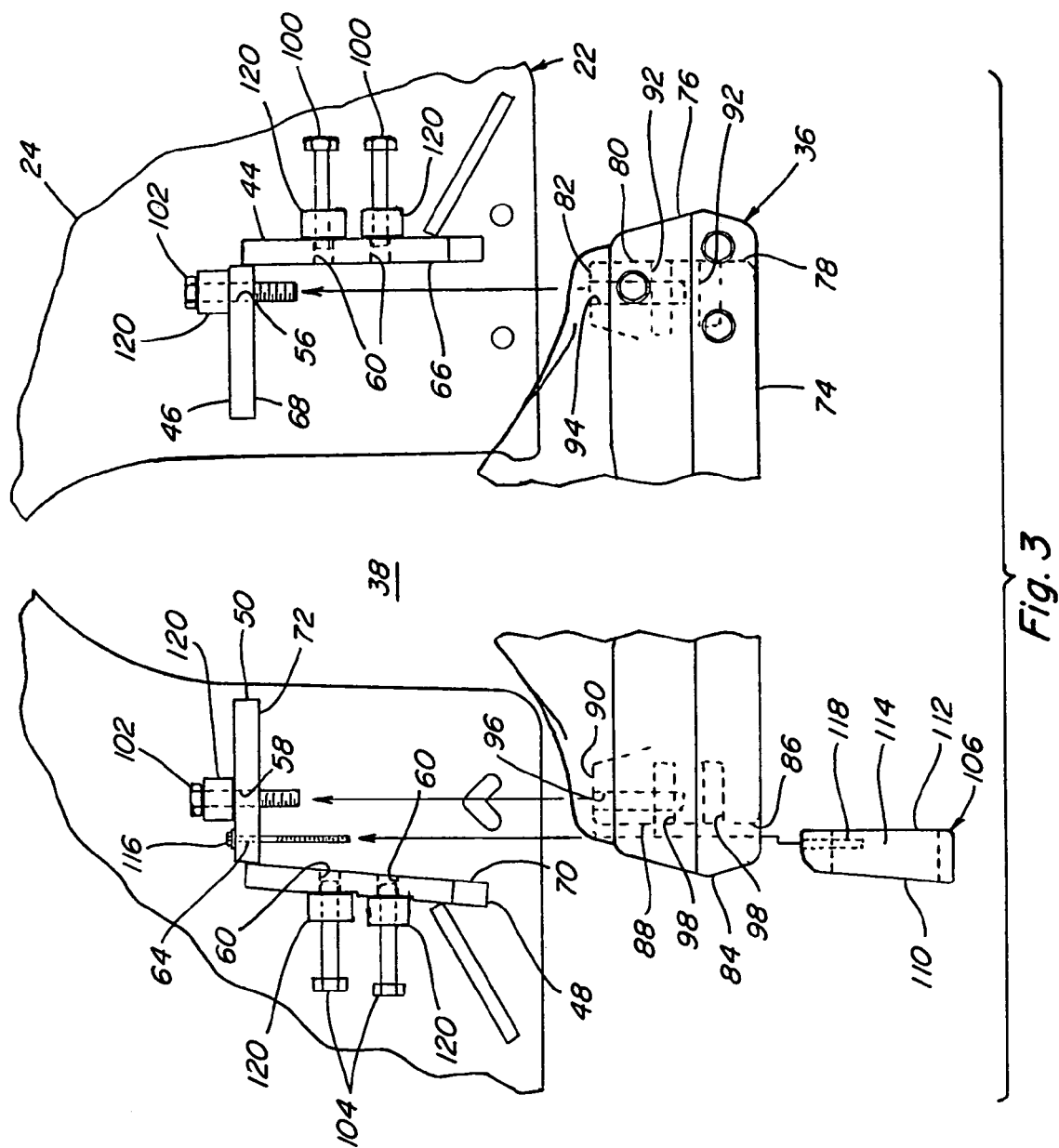
FIG. 3 is an enlarged, fragmentary side exploded view of the chassis and an axle of the tractor of FIG. 1, including aspects of apparatus of the invention, illustrating assembly thereof.

Referring also to FIG. 2a and FIG. 3, rear axle 36 preferably includes a cast or otherwise suitably formed axle housing 74 containing the moving components thereof and including a plurality of external mounting pads on each side including locating surfaces positioned and oriented for mounting in mating relation to the locating surfaces on the mounting pads 44, 46 and 50 on the side chassis plates of rear chassis 22, represented by left side chassis plate 24. Using the left side as an example representative of the right side also, axle housing 74 includes a rearwardly extending ear 76 (FIG. 3) including a rear mounting pad 78 having a rearwardly facing, vertical locating surface 80 positioned for matingly abutting or engaging forwardly facing vertical locating surface 66 of mounting plate 44, and an upwardly facing, horizontal locating surface 82 positioned for matingly abutting or engaging downwardly facing locating surface 68, for locating axle housing 74 in the desired position in relation to chassis 22. Axle housing 74 additionally includes a forwardly extending ear 84 including a forward mounting pad 86 having a forwardly facing, preferably vertical wedge surface 88 positioned so as to be in predetermined fore to aft spaced relation to wedge surface 70 when axle housing 74 is in the desired position in relation to chassis 22. Mounting pad 86 also has an upwardly facing, horizontal locating surface 90, positioned for abutting or engaging downwardly facing locating surface 72, when axle housing 74 is in the desired position. Additionally, locating surface 80 has a pair of rearwardly facing threaded holes 92 therein; locating surface 82 has an upwardly facing threaded hole 94 therein; locating surface 90 has an upwardly facing threaded hole 96 therein; and wedge surface 88 has a pair of threaded holes 98 therein; aligned with holes 60 in plate 44; hole 56 in plate 46; hole 72 in plate 50; and holes 60 in plate 48, for threadedly receiving a plurality of connectors, preferably bolts 100, 102 and 104, respectively, when axle housing 74 is in the desired position, for connection to chassis 22. Here, it should be noted that the rearwardly located horizontally extending bolts are identified by reference number 100, whereas the vertically extending bolts are identified by number 102, and the forwardly located bolts are identified by number 104.

Thus, as a result of the above described arrangement, axle housing 74 can be fitted-up to chassis 22 by upward movement in relation thereto, as denoted by the arrows in FIG. 3, to bring the mating pairs of locating surfaces 66 and 80; 68 and 82; and 72 and 90 into abutting engagement, and such that wedge surfaces 70 and 88 will be in opposing, spaced apart, angularly related relation. Bolts 100 can then be inserted through holes 60 and threaded into holes 92; and bolts 102 through hole 56 and threaded into hole 94, and through hole 72 and threaded into hole 96, and tightened to desired torque levels to securely connect and mount axle housing 74 to side plate 24. The same can be done on the right side of the chassis. Bolts 104 are not yet inserted into threaded holes 98.

As noted under the Background Art heading, chassis 24, as a result of welding and manufacturing tolerances and other conditions, is likely to be at least somewhat distorted and/or deformed, such that the mating locating surfaces will not be in perfect abutment when in their free states, not yet connected together. The mating surfaces will be brought together by the tightening of bolts 100 and 102, such that at least some of the distortion and/or deformation will be reduced or eliminated essentially by straightening of the weldment, and, as a result, the bolts will be subject to normal longitudinal loading, as denoted by arrow A in FIG. 4. Additionally, bolts 102 particularly, will often be subject to transverse shear loads, mainly in the fore and aft direction, as a result of residual stresses in chassis 22 acting to urge it back to its deformed or distorted state, as denoted by arrow B in FIG. 4.

Figure 4:
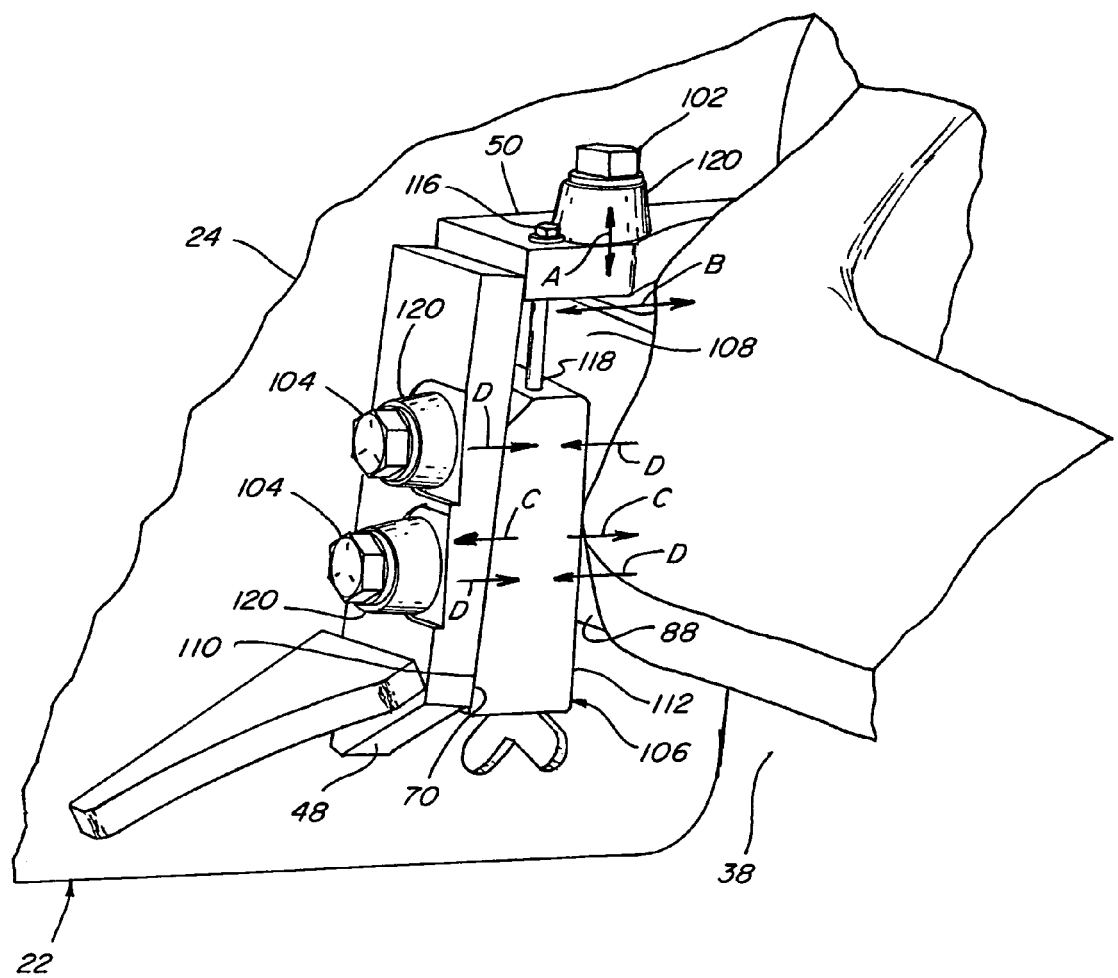
FIG. 4 is an enlarged, fragmentary perspective view of the chassis and axle of FIG. 3, showing a tapered block of the apparatus of the invention disposed therebetween.

Referring more particularly to FIG. 4, the present invention reduces such shear loading on the bolts, by utilizing a wedge member or a tapered block 104, inserted and wedged into a space 108 between wedge surfaces 70 and 88, and having oppositely facing outer surfaces 110 and 112 thereby placed into abutment with those surfaces, respectively, so as to exert a fore and aft directed force against those surface, denoted by arrows C, effectively acting to push those surfaces apart and counteracting the shear loads B. Such forces will also act in opposition to and reduce tensile loads acting on bolts 100. Tapered block 104 has at least one passage 114 therethrough (FIG. 3) for the passage of bolts 104 therethrough, to allow insertion of those bolts into threaded holes 98 and tightening those bolts to exert compressive forces against tapered block 106, denoted by arrows D, for holding that block in position. This may also be sufficient to apply a tensile load against bolts 100, which are preferably at least generally longitudinally aligned therewith as shown. As a result, a force equilibrium condition can be achieved, which can significantly and predictably reduce and control shear forces acting against the bolts or other connectors for connecting axle housing 74 to the side plates 24 of chassis 22.

Additionally, to facilitate insertion and wedging of tapered block 106 into space 108 to a desired position for achieving desired reduction of shear loads, an optional adjusting member, which is preferably an adjusting bolt 116, is preferably inserted through adjusting hole 64 and into a threaded hole 118 in the top of block 106, and tightened as required. This also eliminates need for shims.

Further, spacers 120 can be used around bolts 100, 102, and 104 to allow elongation thereof, for achieving desired torque levels thereon.

Figure 5:
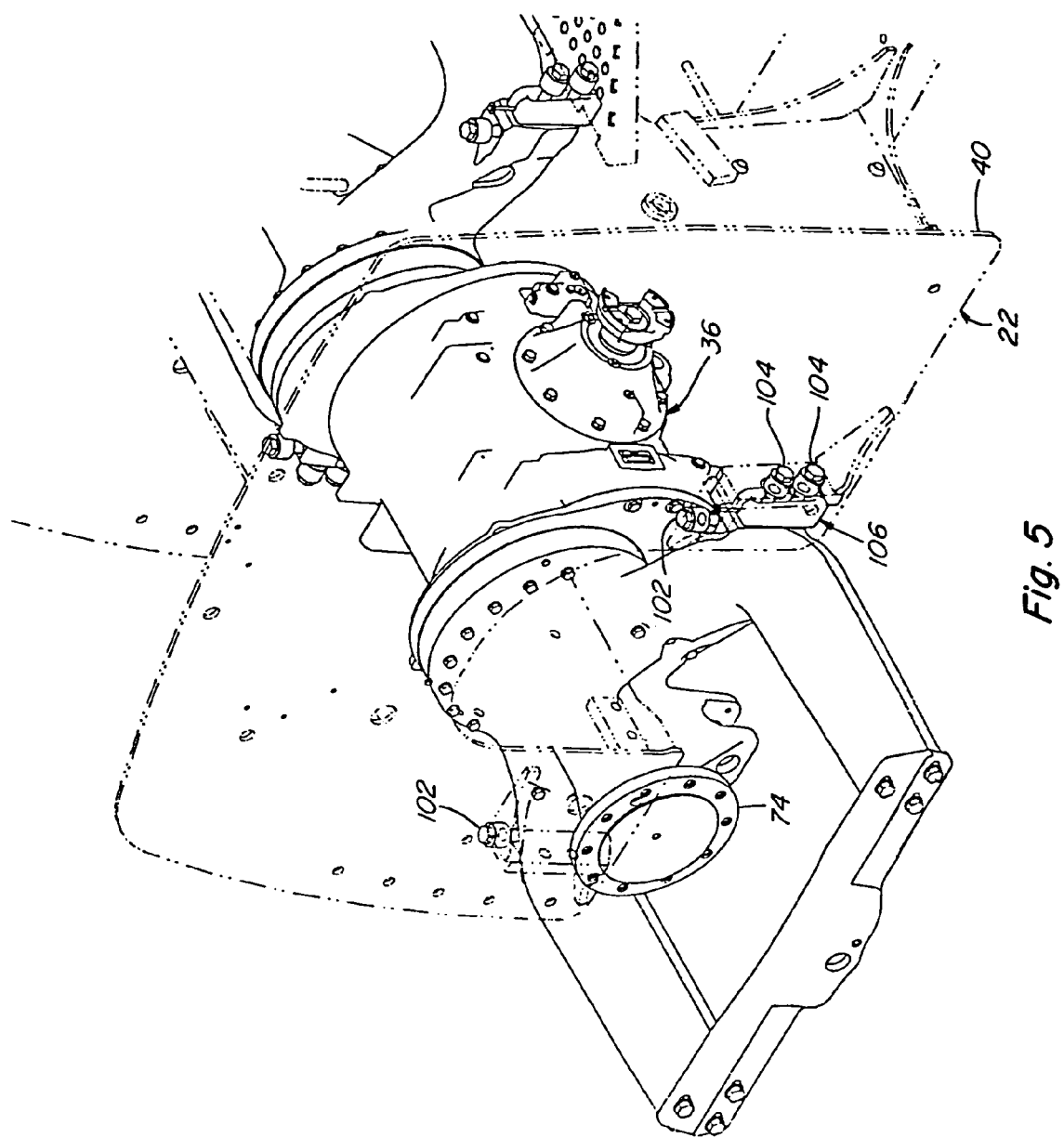
FIG. 5 is a simplified, perspective representation of the assembled chassis and axle, showing the locations of fasteners connecting the axle to the chassis.

FIG. 5 shows the right side of rear chassis 22 and rear axle 36, illustrating the relationship of axle housing 74 and right side chassis plate 40; and tapered block 106, and bolts 102 and 104.

The teachings above and illustrations of the Figures are likewise applicable for the connection of front chassis 20 and front axle 34 (FIG. 1).

It should be noted and understood that as used herein, the terms wedge member and tapered block are used interchangeably.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. Apparatus for assembling an axle and a vehicle chassis, comprising:
   a plurality of locating surfaces on the chassis against which mating surfaces on the axle can be urged for positioning the axle in a desired position in relation to the chassis;
   a plurality of connectors extending in a predetermined direction for rigidly connecting the axle to the chassis in the desired position;
   wedge surfaces on the chassis and on the axle, respectively, disposed so as to be in opposing relation at a predetermined acute angle one relative to the other and define a space therebetween when the axle is in the desired position in relation to the chassis; and
   a tapered block having oppositely facing outer surfaces angularly related at about the predetermined acute angle, the tapered block being positionable in the space between the wedge surfaces and having an extent between the outer surfaces thereof sufficiently large so as to simultaneously contact the wedge surfaces when the tapered block is positioned in the space, and an adjusting member for connecting the tapered block to at least one of the chassis and the axle and adjustable for moving the tapered block to a position for applying forces against the wedge surfaces urging the wedge surfaces apart for reducing at least some of any shear forces acting against the connectors connecting the housing to the chassis and thereby maintaining a rigidly fixed relationship between the chassis and the axle.

2. Apparatus of claim 1, further comprising at least one additional connector for fixing the tapered block in the position for applying the forces against the wedge surfaces.

3. Apparatus of claim 1, wherein the adjusting member comprises a threaded fastener threadedly engageable with the tapered block for moving the tapered block to the position for applying the forces against the wedge surfaces.

4. Apparatus of claim 1, wherein the acute angle is within a range of from about 1° to about 30°.

5. Apparatus of claim 1, wherein the tapered block includes an elongate passage extending therethrough between the outer surfaces thereof and adapted for receiving at least one of the connectors.

6. Apparatus mounting an axle to structural elements of a vehicle chassis, comprising:
   a plurality of connectors for rigidly connecting the axle to the structural elements, at least one of the connectors extending between at least one of the structural elements and the axle and being positioned and oriented so as to be subjected to a shear force;
   wedge surfaces on the axle and on at least one of the structural elements, respectively, disposed in opposing relation defining a space therebetween, the wedge surfaces being oriented at an acute angle one relative to the other and facing at least generally in a direction of the shear force; and
   a tapered block having oppositely facing outer surfaces oriented at about the acute angle one relative to the other, the tapered block being disposed in the space between the wedge surfaces and bearing thereagainst to apply a force against at least one of the structural elements and the axle in a direction for counteracting the shear force and maintaining a rigidly fixed relationship between at least one of the structural elements and the axle.

7. Apparatus of claim 6, wherein the tapered block is held against the wedge surfaces by an adjusting member operable for adjustably moving the tapered block for changing the force applied against the structural element and the axle.

8. Apparatus of claim 6, further including at least one connector for mounting the tapered block in the space bearing against the wedge surfaces for applying the force against the structural element and the axle.

9. Apparatus for mounting an axle housing to a chassis of a vehicle, comprising:
   pairs of mounting pads each including a pad on the axle housing and a pad on the chassis, positioned so as to be capable of being brought into abutment by tightening of fasteners for rigidly connecting the axle housing to the chassis in a predetermined mounting position in relation to the chassis, at least one of the pairs of mounting pads being oriented to extend in a first direction and at least one of the pairs of mounting pads being oriented to extend in a second direction angularly related to the first direction;
   fasteners tightenable for rigidly connecting the axle housing to the chassis and for bringing the pairs of mounting pads into abutment, respectively;
   a pair of wedge surfaces including a wedge surface on the axle housing and a wedge surface on the chassis, the wedge surfaces being positioned so as to extend in the second direction oriented at an acute angle one relative to the other in opposing relation defining a space therebetween when the axle housing is in the predetermined mounting position;
   a tapered block positionable in the space between the wedge surfaces and adjustably movable in the second direction relative thereto for applying a force thereagainst when the fastener are tightened for reducing any shear force acting against one or more of the tightened fasteners and maintaining a rigidly fixed relationship between the chassis and the axle housing.

10. Apparatus of claim 9 further including an adjusting member for moving the tapered block in the space in contact with the wedge surfaces for varying the force applied thereagainst.

11. Apparatus of claim 9, further including at least one fastener for holding the tapered block in the space in a desired position in contact with the wedge surfaces.

12. Apparatus of claim 9, further including an adjusting member operable by applying a torque thereagainst for moving the tapered block in the space in contact with the wedge surfaces for applying a force against the wedge surfaces corresponding to the applied torque.

13. A method for mounting an axle to a chassis of a vehicle, comprising the steps of:
   providing pairs of mounting pads each including a pad on the axle and a pad on the chassis, positioned so as to be capable of being brought into abutment by tightening of fasteners for rigidly connecting the axle to the chassis in a predetermined mounting position in relation to the chassis, at least one of the pairs of mounting pads being oriented to extend in a first direction and at least one of the pairs of mounting pads being oriented to extend in a second direction angularly related to the first direction;
   providing fasteners tightenable for connecting the axle to the chassis and for bringing the pairs of mounting pads into abutment, respectively;
   providing a pair of wedge surfaces including a wedge surface on the axle and a wedge surface on the chassis, the wedge surfaces being positioned so as to extend in the second direction and being oriented in a acute angle one relative to the other in opposing relation defining a space therebetween when the axle is in the predetermined mounting position;

positioning the axle in the predetermined mounting position and tightening the fasteners to bring the pairs of mounting pads into abutment, respectively; and positioning a tapered block in the space between the wedge surfaces and driving the tapered block into the second direction against the wedge surfaces for applying a force thereagainst which is transmitted thereby to the axis and the chassis for reducing any shear force acting against one or more of the tightened fasteners and thereby maintaining a rigidly fixed relationship between the chassis and the axle.

14. The method of claim 13, wherein the tapered block is forced against the wedge surfaces by tightening a fastener connecting the tapered block to one of the axle and the chassis.

\* \* \* \* \*